United States Patent
Chuang et al.

(10) Patent No.: US 9,641,837 B2
(45) Date of Patent: May 2, 2017

(54) METHOD AND APPARATUS FOR MV SCALING WITH INCREASED EFFECTIVE SCALING RATIO

(71) Applicant: HFI Innovation Inc., Zhubei, Hsinchu County (TW)

(72) Inventors: Tzu-Der Chuang, Hsinchu (TW); Jian-Liang Lin, Yilan (TW); Ching-Yeh Chen, Taipei (TW); Yi-Wen Chen, Taichung (TW); Yu-Wen Huang, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 361 days.

(21) Appl. No.: 14/353,025

(22) PCT Filed: Nov. 7, 2012

(86) PCT No.: PCT/CN2012/084215
§ 371 (c)(1),
(2) Date: Apr. 20, 2014

(87) PCT Pub. No.: WO2013/067932
PCT Pub. Date: May 16, 2013

(65) Prior Publication Data
US 2014/0247884 A1  Sep. 4, 2014

Related U.S. Application Data

(60) Provisional application No. 61/556,480, filed on Nov. 7, 2011.

(51) Int. Cl.
*H04N 19/42* (2014.01)
*H04N 19/513* (2014.01)
(Continued)

(52) U.S. Cl.
CPC ....... *H04N 19/00684* (2013.01); *H04N 19/42* (2014.11); *H04N 19/513* (2014.11);
(Continued)

(58) Field of Classification Search
CPC .. H04N 19/00684; H04N 19/30; H04N 19/51; H04N 19/513; H04N 19/52; H04N 19/58; H04N 19/567
See application file for complete search history.

(56) References Cited

U.S. PATENT DOCUMENTS

| | | | |
|---|---|---|---|
| 2009/0060038 A1 | 3/2009 | Nakaishi et al. | |
| 2009/0207917 A1* | 8/2009 | Kadono | G06F 1/03 375/240.16 |

(Continued)

FOREIGN PATENT DOCUMENTS

| | | |
|---|---|---|
| CN | 1523896 | 8/2004 |
| CN | 1523896 A | 8/2004 |

(Continued)

OTHER PUBLICATIONS

Yamaguchi et al., SHD Movie Distribution System Using Image Container with 4096x33 2160 Pixel Resolution and 36 Bit Color, IEEE International Symposium on Circuits and Systems, 2005, pp. 5918-5921.*

(Continued)

*Primary Examiner* — Thai Tran
*Assistant Examiner* — Christopher T Braniff
(74) *Attorney, Agent, or Firm* — McClure, Qualey & Rodack, LLP

(57) ABSTRACT

A method and apparatus for deriving a scaled MV (motion vector) for a current block based on a candidate MV associated with a candidate block are disclosed. Embodiments according to the present invention increase effective scaling factor of motion vector scaling. In one embodiment, (Continued)

a distance ratio of a first picture distance between a current picture and a target reference picture pointed to by a current motion vector of the current block to a second picture distance between a candidate picture corresponding to the candidate block and a candidate reference picture pointed to by the candidate MV is computed. The scaled MV is then generated based on the candidate MV according to the distance ratio, where the scaled MV has an effective scaling ratio between −m and n, and wherein m and n are positive integers greater than 4. The values of m and n can be 8, 16 or 32.

4 Claims, 5 Drawing Sheets

(51) Int. Cl.
*H04N 19/52* (2014.01)
*H04N 19/51* (2014.01)
*H04N 19/58* (2014.01)
*H04N 19/567* (2014.01)

(52) U.S. Cl.
CPC ............. *H04N 19/52* (2014.11); *H04N 19/58* (2014.11); *H04N 19/567* (2014.11)

(56) References Cited

U.S. PATENT DOCUMENTS

2013/0022127 A1* 1/2013 Park ................. H04N 19/52
375/240.16
2015/0098511 A1 4/2015 Park et al.
2016/0241871 A1 8/2016 Park et al.

FOREIGN PATENT DOCUMENTS

WO 2011126345 A2 10/2011
WO WO 2011/126345 10/2011

OTHER PUBLICATIONS

Yamaguchi, T., et al.; "SHD Movie Distribution System Using Image Container with 4096X33 2160 Pixel Resolution and 36 Bit Color;" IEEE; 2005; pp. 5918-5921.
Bross, B., et al.; "WD4 Working draft 4 of high-Efficiency Video Coding," Joint Collaborative Team on Video Coding (JCT-VC) of ITU-T SG16 WP3 and ISO/IEC JTC1/SC29/WG11; Jul. 2011; pp. 1-5.
Bross, B., et al.; "WD4: Working Draft 4 of High-Efficiency Video Coding," Joint Collaborative Team on Video Coding (JCT-VC) of ITU-T SG16 WP3 and ISO/IEC JTC1/SC29/WG11; Jul. 2011; pp. 1-215.
Chuang, T.D., et al.; "Non-CE9: Division-free MV scaling," 7th JCT-VC Meeting in Geneva; Nov. 2011; pp. 1-13.

* cited by examiner

METHOD AND APPARATUS FOR MV SCALING WITH INCREASED EFFECTIVE SCALING RATIO

CROSS REFERENCE TO RELATED APPLICATIONS

The present invention claims priority to U.S. Provisional Patent Application, Ser. No. 61/556,480, filed on Nov. 7, 2011, entitled "Division-Free MV Scaling". The U.S. Provisional Patent Application is hereby incorporated by reference in its entirety.

TECHNICAL FIELD

The present invention relates to video coding. In particular, the present invention relates to derivation of motion vector predictor (MVP) by scaling a candidate motion vector with increased effective scaling ratio for High Efficiency Video Coding (HEVC).

BACKGROUND

High-Efficiency Video Coding (HEVC) is a new international video coding standard that is being developed by the Joint Collaborative Team on Video Coding (JCT-VC). HEVC is based on the hybrid block-based motion-compensated DCT-like transform coding architecture. The basic unit for compression, termed Coding Unit (CU), is a 2N×2N square block, and each CU can be recursively split into four smaller CUs until a predefined minimum size is reached. Each CU contains one or multiple Prediction Units (PUs). The PU sizes can be 2N×2N, 2N×N, 2N×nU, 2N×nD, N×2N, nL×2N, nR×2N, or N×N, where 2N×N, 2N×nU, 2N×nD and N×2N, nL×2N, nR×2N correspond to horizontal and vertical partition of a 2N×2N PU with symmetric or asymmetric PU size division respectively.

To further increase the coding efficiency of motion vector coding in HEVC, the motion vector competition (MVC) based scheme is applied to select one motion vector predictor (MVP) among a given MVP candidate set which includes spatial and temporal MVPs. There are three inter-prediction modes including Inter, Skip, and Merge in the HEVC test model version 3.0 (HM-3.0). The Inter mode performs motion-compensated prediction with transmitted Motion Vector Differences (MVDs) that can be used together with MVPs for deriving motion vectors (MVs). The Skip and Merge modes utilize motion inference methods (MV=MVP+MVD where MVD is zero) to obtain the motion information from spatial neighboring blocks (spatial candidates) or temporal blocks (temporal candidates) located in a co-located picture. The co-located picture is the first reference picture in list 0 or list 1, which is signaled in the slice header.

When a PU is coded in either Skip or Merge mode, no motion information is transmitted except for the index of the selected candidate. In the case of a Skip PU, the residual signal is also omitted. For the Inter mode in HM-3.0, the Advanced Motion Vector Prediction (AMVP) scheme is used to select a motion vector predictor among an AMVP candidate set including two spatial MVPs and one temporal MVP. In this disclosure MVP may refer to motion vector predictor or motion vector prediction. As for the Merge and Skip mode in HM-3.0, the Merge scheme is used to select a motion vector predictor among a Merge candidate set containing four spatial MVPs and one temporal MVP.

For the Inter mode, the reference picture index is explicitly transmitted to the decoder. The MVP is then selected among the candidate set for a given reference picture index. FIG. 1 illustrates the MVP candidate set for the Inter mode according to HM-3.0, where the MVP candidate set includes two spatial MVPs and one temporal MVP:
1. Left predictor (the first available MV from $A_0$ and $A_1$),
2. Top predictor (the first available MV from $B_0$, $B_1$, and $B_{n+1}$), and
3. Temporal predictor (the first available MV from $T_{BR}$ and $T_{CTR}$).

A temporal predictor is derived from a block ($T_{BR}$ or $T_{CTR}$) in a co-located picture, where the co-located picture is the first reference picture in list 0 or list 1. The block associated with the temporal MVP may have two MVs: one MV from list 0 and one MV from list 1. The temporal MVP is derived from the MV from list 0 or list 1 according to the following rule:
1. The MV that crosses the current picture is chosen first, and
2. If both MVs cross the current picture or both do not cross, the MV with the same reference list as the current list will be chosen.

In HM-3.0, if a particular block is encoded in the Merge mode, an MVP index is signaled to indicate which MVP among the MVP candidate set is used for this block to be merged. To follow the essence of motion information sharing, each merged PU reuses the MV, prediction direction, and reference picture index of the selected candidate. It is noted that if the selected MVP is a temporal MVP, the reference picture index is always set to the first reference picture. FIG. 2 illustrates the MVP candidate set for the Merge mode according to HM-3.0, where the MVP candidate set includes four spatial MVPs and one temporal MVP:
1. Left predictor ($A_m$),
2. Top predictor ($B_n$),
3. Temporal predictor (the first available MV from $T_{BR}$ or $T_{CTR}$),
4. Above-right predictor ($B_0$), and
5. Below-left predictor ($A_0$).

In HM-3.0, a process is utilized in both Inter and Merge modes to avoid an empty candidate set. The process adds a candidate with a zero MV to the candidate set when no candidate can be inferred in the Inter, Skip or Merge mode.

Based on the rate-distortion optimization (RDO) decision, the encoder selects one final MVP for Inter, Skip, or Merge modes from the given MVP list and transmits the index of the selected MVP to the decoder after removing redundant MVPs in the list. However, because the temporal MVP is included in the MVP list, any transmission error may cause parsing errors at the decoder side and the error may propagate. When an MV of a previous picture is decoded incorrectly, a mismatch between the MVP list at the encoder side and the MVP list at the decoder side may occur. Therefore, subsequent MV decoding may also be impacted and the condition may persist for multiple subsequent pictures.

In HM-4.0, in order to solve the parsing problem related to Merge/AMVP in HM-3.0, fixed MVP list size is used to decouple MVP list construction and MVP index parsing. Furthermore, in order to compensate the coding performance loss caused by the fixed MVP list size, additional MVPs are assigned to the empty positions in the MVP list. In this process, Merge index is coded using truncated unary codes of fixed length equal to 5 or less, and AMVP index is coded using fixed length equal to 2 or less.

Another change in HM-4.0 is the unification of MVP positions. Both Merge and Skip use the same positions shown in FIG. 3. For Merge mode in HM-4.0, up to four spatial MVPs are derived from $A_0$, $A_1$, $B_0$, and $B_1$, and one temporal MVP is derived from $T_{BR}$ or $T_{CTR}$. For the temporal MVP, $T_{BR}$ is used first. If $T_{BR}$ is not available, $T_{CTR}$ is used instead. If any of the four spatial MVPs is not available, the block position $B_2$ is then used to derive MVP as a replacement. After the derivation process of the four spatial MVPs and one temporal MVP, the process of removing redundant MVPs is applied. If the number of available MVPs is smaller than five after redundant MVP removal, three types of additional MVPs are derived and are added to the MVP list.

In the derivation for the spatial and temporal MVPs, the MVP can be derived with the MV pointing to the same reference picture as the target reference picture. Alternatively, the MVP can be derived from a candidate MV pointing to a different reference picture. FIG. 4 illustrates an example of deriving a spatial MVP based on various types of motion vectors associated with spatial neighboring candidate blocks, where the candidate blocks comprises spatial neighboring blocks $A_0$, $A_1$, $B_0$, $B_1$ and $B_2$, and temporal co-located blocks $T_{BR}$ or $T_{CTR}$. The circled numbers refer to the search order for determining an MVP from respective candidates. The highest priority of search corresponds to an MV pointing to the target reference picture within the given reference list. The next highest priority of search corresponds to an MV pointing to the target reference picture within the other reference list. The third and fourth search priorities correspond to other reference picture within the given and other reference lists respectively. In the particular example of FIG. 4, the availability of motion vectors 1 and 2 is checked together, and the availability of motion vectors 3 and 4 is checked together. The availability of motion vectors 1 and 2 is checked from candidate blocks $A_0$ through $A_1$ and then from $B_0$ through $B_2$. If none of the MVs exists, the search checks the availability of motion vector 3 and 4 through all the blocks. When the MVP is derived from an MV pointing to a different reference picture or the MV is for a co-located picture, the MV may have to be scaled to take into consideration of different picture distances. The exemplary search patterns for MVP derivation as shown in FIG. 4 shall not be construed as limitations to the present invention as described in this application. For example, the availability of motion vectors 1 through 4 for each block can be checked together. In another example, motion vector 1 can be checked first in the order from $A_0$ to $A_1$ and then from $B_0$ to $B_2$. If none of the MVs exists, the search moves to check the availability of motion vector 2 from $A_0$ to $A_1$ and then from $B_0$ to $B_2$. The process will continue for motion vector 3 and motion vector 4 if the spatial MVP has not been derived.

In the derivation process for the spatial and temporal MVPs, the division operation is required to scale the motion vector. The scaling factor is calculated based on the picture distance ratio. For example, the MVP may be derived based on the MV of a co-located block. The picture distance scaling factor, DistScaleFactor is computed according to:

$$DistScaleFactor = \frac{POC_{curr} - POC_{ref}}{POC_{temp} - POC_{temp\_ref}}, \quad (1)$$

where $POC_{curr}$ and $POC_{ref}$ represent the picture order counts (POCs) of the current picture and the POC of the target reference picture respectively, and $POC_{temp}$ and $POC_{temp\_ref}$ represent the POC of the co-located picture and the POC of the reference picture pointed to by the MV of the co-located block respectively. While the MV of a co-located block is used to illustrate the derivation of picture distance scaling factor, the MV of a spatial neighboring block may also be used to derive the MVP and the corresponding derivation of picture distance scaling factor can be shown similarly.

In an implementation according to HM-4.0, the POC distance between current picture and the target reference picture and the POC distance between the co-located picture and the reference picture pointed to by the MV of the co-located block are first constrained within a given range, i.e.:

$$DiffPOC_{curr}=clip(-128,127,POC_{curr}-POC_{ref}),$$

$$DiffPOC_{temp}=clip(-128,127,POC_{temp}-POC_{temp\_ref}).$$

The scaling factor is then calculated according to the following equations:

$$X = \frac{2^{14} + \left|\frac{DiffPOC_{temp}}{2}\right|}{DiffPOC_{temp}}, \text{ and} \quad (2)$$

$$DistScaleFactor = clip(-1024, 1023, (DiffPOC_{curr} \times X + 32) >> 6) \quad (3)$$

The scaled MVP is derived by multiplying the MV by the distance scaling factor, i.e.:

$$ScaledMV=sign(DistScaleFactor \times MV) \times ((|DistScaleFactor \times MV+127)>>8) \quad (4)$$

The picture scaling factor in the form of equation (1) will require division operation, which is more complicated for hardware implement or consumes more CPU time in software based implementation. The essence of the implementation based on HM4.0 is to pre-multiply the distance ratio by a multiplication factor ($2^{14}$ in this equation (2)) so that the distance ratio becomes an integer. In equation (2), an offset term, $|DiffPOC_{temp}/2|$ is added to $2^{14}$ to take care of data conversion with rounding. Similarly, offsets 32 and 127 are added in equations (2) and (3) for data conversion. The multiplication factor can be compensated by simple right-shifting operation. Therefore, the implementation associated with equations (1) through (4) is a preferred approach since the computation of the scaled MV, ScaledMV does not require any division operation.

In HM-4.0, the scaling factor (DistScaleFactor) is clipped to the range [−1024, 1023], as shown in equation (3). The scaling factor will be right shifted by eight bits as shown in equation (4), which implies that the effective scaling range is limited to [−4, 4). A reference picture selection method for a low-delay coding system is disclosed by Li et al. to improve coding efficiency ("*Encoding optimization to improve coding efficiency for low delay cases*", by Li et al., Joint Collaborative Team on Video Coding (JCT-VC) of ITU-T SG16 WP3 and ISO/IEC JTC1/SC29/WG11 6th Meeting: Torino, IT, 14-22 Jul. 2011, Document: JCTVC-F701). According to the method disclosed by Li, et al., one nearest picture and three high quality pictures (pictures with low QPs) are used as reference pictures for low delay cases. FIG. 5 illustrates an exemplary reference frame configuration for the low-delay system, Picture 10 is the current picture and picture 9 is the nearest picture. Pictures 0, 4 and 8 are the three high quality reference pictures. Block 525 corresponds to a current block and block 515 corresponds to a neighboring block. The neighboring block 515 has an associated MV 510 that is used to derive the MVP for the current MV 520 of the current block 525. The picture distance associated with the current MV is 6 while the picture distance associated with the candidate MV is 1. Therefore, the picture scaling factor for this example is 6, which exceeds the supported scaling factor range. Therefore, the effective scaling range [−4, 4) is not sufficient for some applications.

Accordingly, it is desirable to develop a scheme to increase the effective scaling ratio for MV scaling. A system incorporating the increased scaling factor may achieve improved performance.

SUMMARY

A method and apparatus for deriving a scaled MV (motion vector) for a current block based on a candidate MV associated with a candidate block are disclosed. Embodiments according to the present invention increase effective scaling factor of motion vector scaling. In one embodiment of the present invention, a distance ratio of the first picture distance between a current picture and a target reference picture pointed to by a current motion vector of the current block to the second picture distance between a candidate picture corresponding to the candidate block and a candidate reference picture pointed to by the candidate MV is computed. The scaled MV is then generated based on the candidate MV according to the distance ratio, where the scaled MV has an effective scaling ratio between −m and n, and wherein m and n are positive integers greater than 4. The values of m and n can be 8, 16 or 32. In another embodiment, the distance ratio is related to a first scaling factor and a second scaling factor, the first scaling factor is related to the first distance value and the second scaling factor is related to the second distance value. The first scaling factor is then generated by clipping a product value to a range between −p and (p−1), where the product value is related to a first component derived by multiplying the first distance value by the second scaling factor and shifting the first component to the right by 8 bits, and where p is larger than 1024. The scaled MV is related to a second component derived by multiplying the candidate MV by the first scaling factor and shifting the second component to the right by 6 bits. The value of p can be 2048, 4096 or 8192.

DETAILED DESCRIPTION

Figure 1:
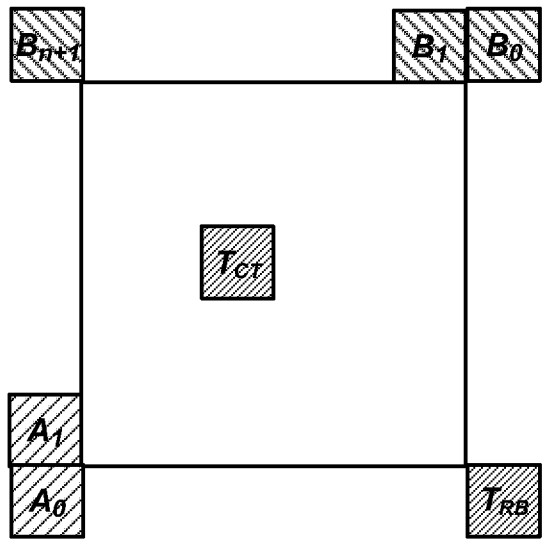
FIG. 1 illustrates an example of neighboring block configuration used to derive MVP candidate set for Inter mode based on Advanced Motion Vector Prediction (AMVP) scheme in HM3.0.
Figure 2:
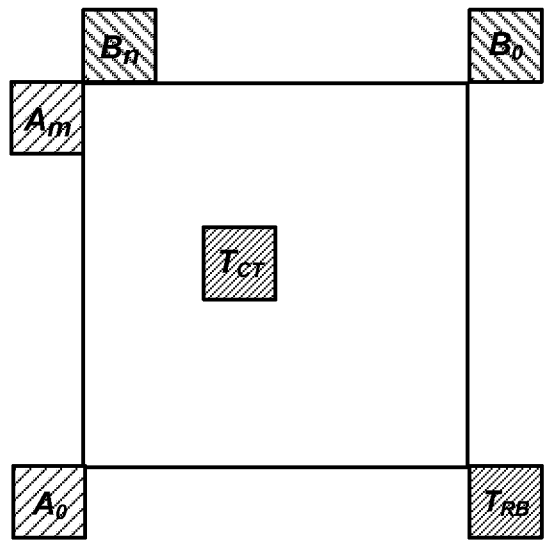
FIG. 2 illustrates an example of neighboring block configuration used to derive MVP candidate set for Skip and Merge modes in HM3.0.
Figure 3:
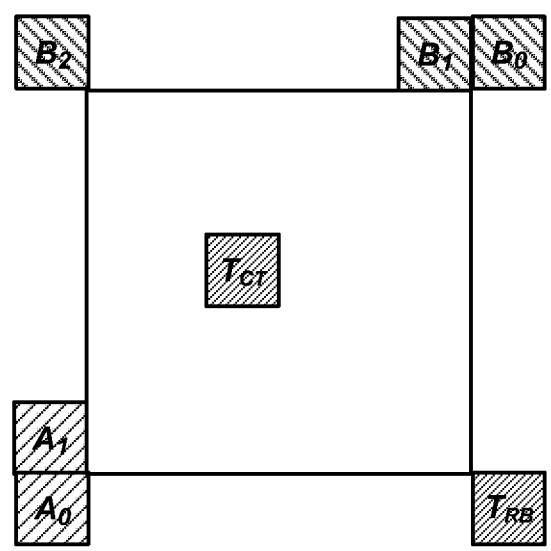
FIG. 3 illustrates an example of neighboring block configuration used to derive MVP candidate set for AMVP/Merge modes in HM4.0.
Figure 4:
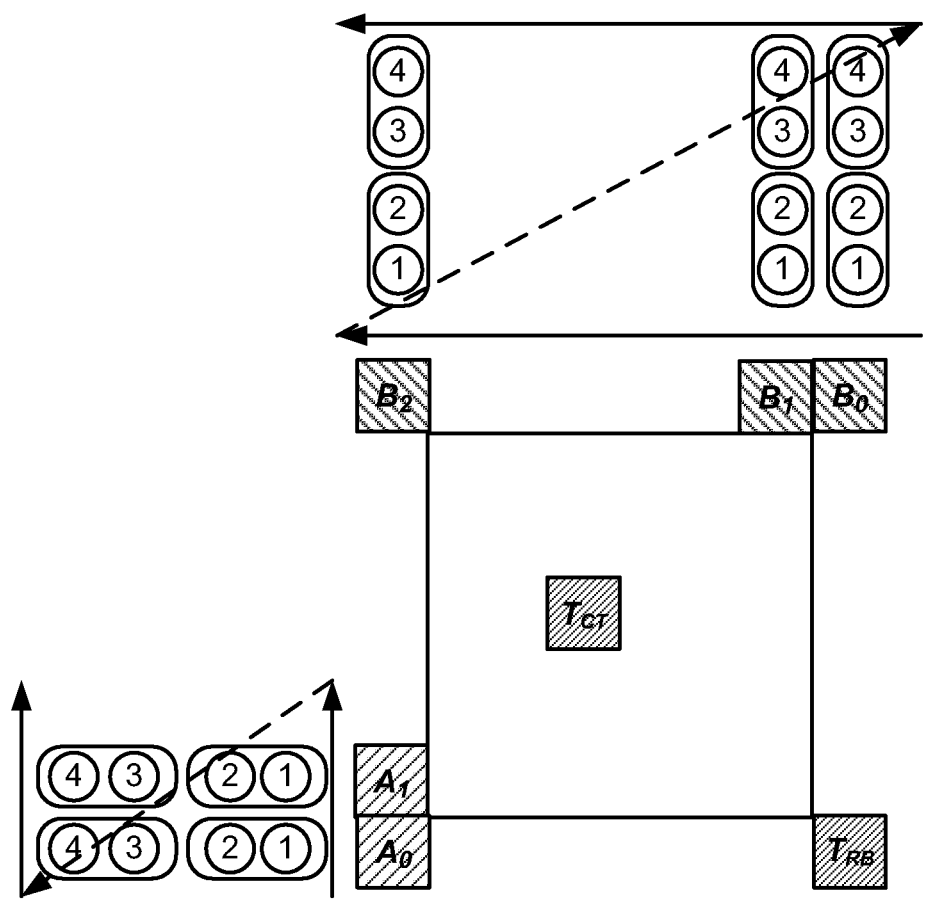
FIG. 4 illustrates an exemplary search order of MVP list for Advanced Motion Vector Prediction (AMVP) in HM4.0.
Figure 5:
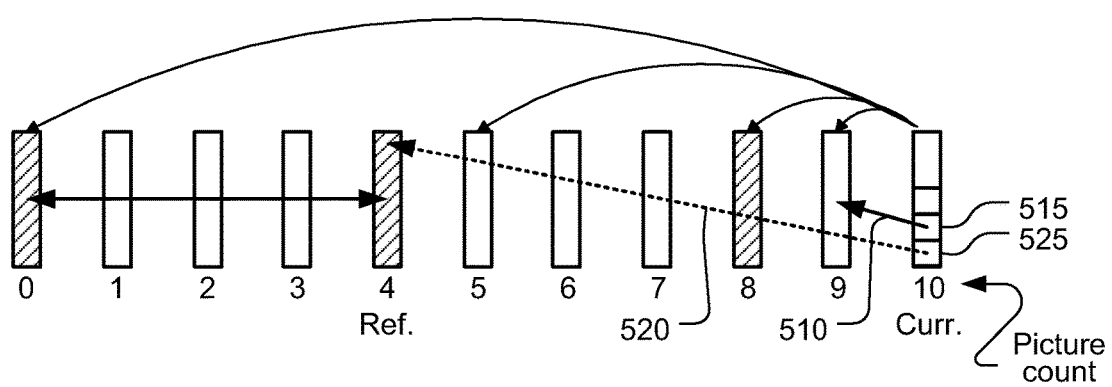
FIG. 5 illustrates an example of reference frame configuration for a low delay coding system.

As mentioned before, the scaling factor range is insufficient for some video coding systems, such as a low delay system using one nearest picture and three highest quality pictures. To overcome the insufficient scaling factor range issue associated with MVP derivation, embodiments of the present invention increase the effective scaling range. A system incorporating an embodiment of the present invention may have an effective scaling range [−8, 8), [−16, 16), or [−32, 32) to accommodate the reference pictures with longer temporal distances.

In the motion vector predictor (MVP) derivation according to HM-4.0, the MV is scaled to the target reference picture as the final MVP when an MVP is derived from an MV pointing to a different reference picture. In the MV scaling process, the scaling factor is defined by equation (5):

$$\text{ScalingFactor} = (POC_{curr} - PoC_{ref})/(POC_{col} - POC_{col\_ref}) = tb/td, \quad (5)$$

where td is the POC distance between the co-located picture and the reference picture pointed to by the MV of the co-located block, and tb is the POC distance between the current picture and the target reference picture. The scaling factor for MVP derivation based on a spatial neighboring block can be computed similarly. In HM-4.0, the scaling factor is calculated according to:

$$X = (2^{14} + |td/2|)/td, \text{ and} \quad (6)$$

$$\text{ScalingFactor} = \text{clip}(-1024, 1023, (tb \times X + 32) >> 6). \quad (7)$$

Then, the scaled MV is derived as follows:

$$\text{ScaledMV} = \text{sign}(\text{ScalingFactor} \times MV) \times ((\text{abs}(\text{ScalingFactor} \times MV) + 127)) >> 8) \quad (8)$$

Embodiments according to the present invention increase the effective scaling ratio by increasing the clip value of equation (7) to 2048, 4096, or 8192. For example, equation (7) can be changed as follow:

$$\text{ScalingFactor} = \text{clip}(-2048, 2047, (tb \times X + 32) >> 6), \quad (9)$$

$$\text{ScalingFactor} = \text{clip}(-4096, 4095, (tb \times X + 32) >> 6), \text{ or} \quad (10)$$

$$\text{ScalingFactor} = \text{clip}(-8192, 8191, (tb \times X + 32) >> 6). \quad (11)$$

Accordingly, the effective scaling range can be increased to [−8, 8), [−16, 16), or [−32, 32) respectively.

The division free operation associated with picture distance scaling is accomplished via a value X formed by multiplying (l/td) by $2^{14}$ as shown equation (6). The multiplication factor $2^{14}$ is later compensated by 8-bit right shift during derivation of ScalingFactor as shown in equation (7) and 6-bit right shift during derivation of scaled MV as shown in equation (8). While shifting by 8 bits and 6 bits in equations (7) and (8) respectively are used, other configurations may also be used. For example, instead of right shifting by 8 bits and 6 bits, it can also be configured to right shift by 7 bits and 7 bits in equations (7) and (8) respectively. In this case, since ScalingFactor is derived based on (tb×X) by right shifting 7 bits instead of 6 bits, the resulting value for ScalingFactor is scaled down by a factor of 2. Accordingly, the clip range should also be scaled down by a factor of 2. In this case, the clip values in equations (9) through (11) will become 1024, 2048 and 4096 respectively. Accordingly, equation (6) can be generalized as:

$$ix = (2^k + |td/2|)/td, \text{ and} \quad (12)$$

where k is an integer and k=q+m. Both q and m are integers, where q corresponds to the right shift during derivation of distance scaling factor, DistScalefactor and m corresponds to the right shift during derivation of the scaled MV, scaled_MV_xy. Both DistScalefactor and scaled_MV_xy can be derived as:

$$DistScalefactor=clip(-p,(p-1),(tb*ix+(1<<(q-1)))>>q), \text{ and} \quad (13)$$

$$scaled\_MV\_xy=(DistScaleFactor*MV\_xy+(1<<(m-1))-1+(((DistScaleFactor*MV\_xy)<0)?1:0))>>m \quad (14)$$

where p is an integer associated with the desired clipping range and p is larger than 1024. For example, p may correspond to 2048, 4096 or 8192 and q and m may correspond to 6 and 8 respectively.

Figure 6:
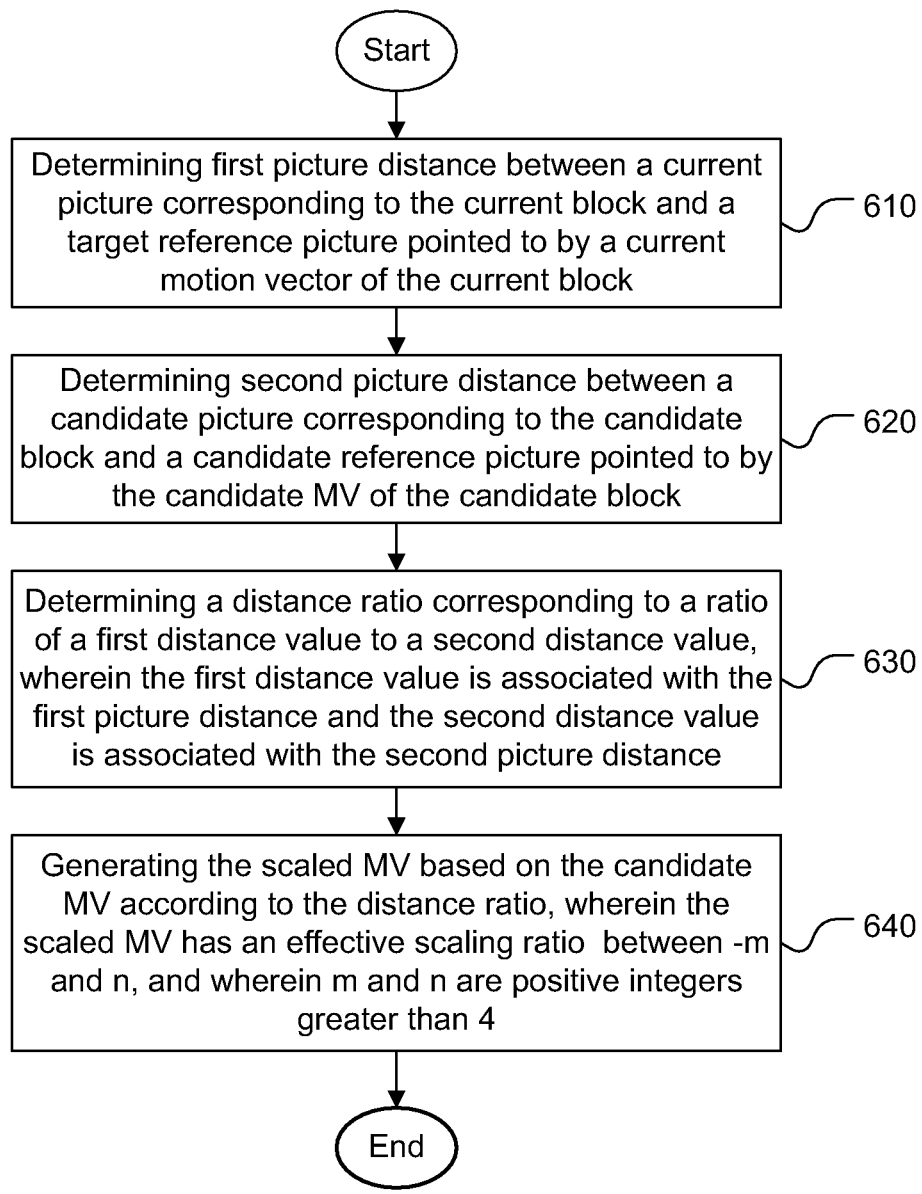
FIG. 6 illustrates an exemplary flow chart of a system incorporating an embodiment of the present invention, where the effective scaling ratio is increased beyond the range between −4 and 4.

FIG. 6 illustrates an exemplary flow chart for a system incorporating an embodiment of the present invention. The first picture distance between a current picture corresponding to the current block and a target reference picture pointed to by a current motion vector of the current block is determined in step 610. The second picture distance between a candidate picture corresponding to the candidate block and a candidate reference picture pointed to by the candidate MV of the candidate block is determined in step 620. The distance ratio corresponding to a ratio of a first distance value to a second distance value is determined in step 630. The first distance value is associated with the first picture distance and the second distance value is associated with the second picture distance. The scaled MV is then generated based on the candidate MV according to the distance ratio in step 640, wherein the scaled MV has an effective scaling ratio between −m and n, and wherein m and n are positive integers greater than 4. In some embodiments, the values of m and n can be 8, 16 or 32. The flow chart in FIG. 6 is intended to illustrate an example of motion vector scaling with increased effective scaling ratio. A skilled person in the art may practice the present invention by re-arranging the steps, split one or more steps, or combining one or more steps.

The distance ratio in step 630 can be calculated by a first scaling factor and a second scaling factor, where the first scaling factor is related to the first distance value determined in step 610, and the second scaling factor is related to the second distance value determined in step 620. The first scaling factor is then generated by clipping a product value to a range between −p and (p−1), where the product value is related to a first component derived by multiplying the first distance value by the second scaling factor and shifting the first component to the right by 8 bits, and where p is larger than 1024. The scaled MV is related to a second component derived by multiplying the candidate MV by the first scaling factor and shifting the second component to the right by 6 bits. The value of p can be 2048, 4096 or 8192.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of deriving a scaled MV (motion vector) for a current block based on a candidate MV associated with a candidate block to provide an effective scaling ratio greater than 4, the method comprising:

determining first picture distance between a current picture corresponding to the current block and a target reference picture pointed to by a current motion vector of the current block;

determining second picture distance between a candidate picture corresponding to the candidate block and a candidate reference picture pointed to by the candidate MV of the candidate block;

determining a pre-scaled distance division having a first value related to dividing a pre-scaling factor by the second picture distance, wherein the pre-scaling factor corresponds to $2^k$, k=m+q and k, m and q are positive integers;

determining a scaling factor by multiplying the first picture distance by the pre-scaled distance division, right-shifting first multiplication result by q bits, and clipping first right-shifting result to a range from −p to (p−1) to obtain a final scaling factor; and generating the scaled MV by multiplying the candidate MV by the final scaling factor, and right-shifting magnitude of second multiplication result by m bits, encoding or decoding the current block based on the scaled MV with the effective scaling ratio;

wherein k, m and q are set to 14, 8 and 6 respectively and p is set to $2^{(m+3)}$, $2^{(m+4)}$ or $2^{(m+5)}$ to cause the effective scaling ratio between the scaled MV and the candidate MV to be 8, 16 and 32 respectively.

2. The method of claim 1, wherein the candidate block corresponds to a spatial neighboring block or a temporal co-located block.

3. A method of deriving a scaled MV (motion vector) for a current block based on a candidate MV associated with a candidate block to provide an effective scaling ratio greater than 4, the method comprising:

determining first picture distance, tb between a current picture corresponding to the current block and a target reference picture pointed to by a current motion vector of the current block;

determining second picture distance, td between a candidate picture corresponding to the candidate block and a candidate reference picture pointed to by the candidate MV of the candidate block;

determining a pre-scaled distance division, ix according to ix=($2^k$+|td/2|)/td, wherein k=m+q and k, m and q are positive integers;

determining a scaling factor, DistScalefactor according to DistScalefactor=clip(−p, (p−1), (tb*ix+(1<<(q−1)))>>q), wherein clip(u,v,w) is a clipping function that limits w to a range between u and v;

generating a scaled MV, scaled_MV_xy based on a candidate MV, MV_xy according to scaled_MV_xy= (DistScaleFactor*MV_xy+(1<<(m−1))−1+ (((DistScaleFactor*MV_xy)<0)?1:0))>>m; and encoding or decoding the current block based on the scaled MV with the effective scaling ratio;

wherein k, m and q are set to 14, 8 and 6 respectively and p is set to $2^{(m+3)}$, $2^{(m+4)}$ or $2^{(m+5)}$ to cause the effective scaling ratio between the scaled MV and the candidate MV to be 8, 16 and 32 respectively.

4. The method of claim 3, wherein the candidate block corresponds to a spatial neighboring block or a temporal co-located block.

\* \* \* \* \*